United States Patent [19]

McDonald et al.

[11] Patent Number: 5,530,048
[45] Date of Patent: Jun. 25, 1996

[54] PHENOLIC RESINS FOR REINFORCED COMPOSITES

[75] Inventors: Roderick A. McDonald, Bothell; Mark J. Knudsen, Seattle, both of Wash.

[73] Assignee: Georgia-Pacific Resins, Inc., Atlanta, Ga.

[21] Appl. No.: 328,815

[22] Filed: Oct. 25, 1994

Related U.S. Application Data

[62] Division of Ser. No. 98,892, Jul. 29, 1993, abandoned.

[51] Int. Cl.$^6$ ............... C08K 3/30; C08L 61/10
[52] U.S. Cl. ............... 524/418; 428/278; 428/260; 428/524; 525/485
[58] Field of Search ............... 525/485; 428/278, 428/260, 524; 524/418

[56] References Cited

U.S. PATENT DOCUMENTS

| | | | |
|---|---|---|---|
| 2,736,703 | 2/1956 | Smith et al. | 252/42.7 |
| 3,065,039 | 11/1962 | Komarek et al. | 8/94.24 |
| 3,108,990 | 10/1963 | Baxter | 260/45.7 |
| 3,300,427 | 1/1967 | Hebert | 260/29.3 |
| 3,328,354 | 6/1967 | Dietrick | 260/54 |
| 3,790,442 | 2/1974 | Ashall | 161/198 |
| 3,872,056 | 3/1975 | Daubach et al. | 528/158 |
| 3,956,205 | 5/1976 | Higginbottom | 260/7 |
| 4,028,271 | 6/1977 | Schaidle et al. | 252/429 R |
| 4,028,367 | 6/1977 | Higginbottom | 260/29.3 |
| 4,043,970 | 8/1977 | Dahms | 260/29.3 |
| 4,079,040 | 3/1978 | Ribka et al. | 260/49 |
| 4,122,054 | 10/1978 | Culbertson | 260/29.3 |
| 4,157,324 | 6/1979 | Culbertson | 260/32.8 R |
| 4,202,959 | 5/1980 | Henbest et al. | 528/254 |
| 4,235,989 | 11/1980 | Leong et al. | 528/139 |
| 4,264,760 | 4/1981 | Meyer | 528/230 |
| 4,608,408 | 8/1986 | Hood et al. | 524/15 |
| 4,620,860 | 11/1986 | Werbowy | 65/3.4 |
| 4,758,478 | 7/1988 | Daisy et al. | 428/529 |
| 4,962,166 | 10/1990 | Boinot et al. | 525/506 |
| 5,032,431 | 7/1991 | Conner et al. | 427/589.8 |
| 5,284,702 | 2/1994 | Umemoto et al. | 428/272 |

*Primary Examiner*—W. Robinson H. Clark
*Attorney, Agent, or Firm*—Banner & Allegretti, Ltd.

[57] ABSTRACT

The present invention is directed to a phenolic resin composition useful for preparing a binder for reinforced composites, to a binder for reinforced composites made using the phenolic resin composition, and to a reinforced composite made using the binder. The phenolic resin composition of the present invention contains an aqueous mixture of: (a) a resole formed by reacting phenol with formaldehyde at a mole ratio of formaldehyde to phenol ranging from about 0.6:1 to about 4:1 and (b) a sulfite or bisulfite, wherein the resole has a pH at least about 7 and less than 9.5 and the composition contains from about 0.007 to about 0.4 mole equivalent of sulfur per mole of phenol.

11 Claims, 3 Drawing Sheets

PHENOLIC RESINS FOR REINFORCED COMPOSITES

This application is a division of application Ser. No. 08/098,892, filed Jul. 29, 1993, now abandoned.

BACKGROUND OF THE INVENTION

1. Field of the Invention

This invention relates to a phenolic resin composition useful for preparing reinforced composites. The present invention particularly relates to a resole-type phenolic, resin containing a sulfite or bisulfite compound which is useful for preparing reinforced composites. The resole resins of the present invention possess superior water dilutability and storage stability, reduced volatile emissions upon curing, and excellent compressive strengths and flexural strength when used to make reinforced composites. The reinforced composites may use inorganic and/or organic fibers, which may be chopped, non-woven or woven, and honeycombed materials as the reinforcing materials, e.g. to form prepregs which are laminated and cured, and cured honeycomb composites for various conventional applications, particularly those requiring excellent flame and smoke properties.

2. Description of the Prior Art

Phenolic resins have long been employed as binders for use with glass fibers in the preparation of fiber reinforced composites. Glass fibers which may be chopped, non-woven or woven are coated or saturated with the aqueous binder solution, usually by dipping or spraying, and passed through an oven where they are compressed to the desired thickness and density, and then permanently fixed by heat setting or curing the resin binder. Phenolics are preferred over many other polymer systems, such as polyesters and epoxies, due to their well known excellent resistance to flame and smoke generation. Thus, their use in the aerospace, ship industry, mass transit, and other applications requiring resistance to fire and smoke generation is expected to grow. However, environmental considerations have directed the composite industry away from the solvent-based phenolic resins. Efforts to employ water-based phenolics have previously resulted in problems with reduced strengths, e.g., reduce compressive strengths, and poor water dilutability during storage.

The properties desired of binder compositions depend to a large extent on the properties of the basic resin. A good binder composition should above all be easily applied and capable of covering and/or bonding the reinforcing components, e.g. fibers and honeycombs, and at the same time it should cause little pollution. Further, the resin should have good long term stability and a high degree of dilutability with water. Since the concept of dilutability is particularly important, it will be defined for the purposes of the present invention as follows: The water dilutability of a resin solution is the volume of de-ionized water which can be added at a given temperature to one unit volume of this solution without producing any permanent perturbation, i.e., haze, clouding or precipitation.

Of particular interest are high efficiency single phase aqueous phenol-formaldehyde resins which have low free phenol and low free formaldehyde. Such resins retain a high percentage of the organic moiety when the resin is cured. However, free phenol and free formaldehyde volatilize in the curing of the resin causing pollution considerations and also reducing the efficiency and performance of the resin in various bonding applications. Accordingly, it is necessary that the resin should be as free as possible from any unconverted starting materials or residues thereof while preserving its useful qualities. The risk of atmospheric pollution is in fact mainly due to the presence of volatile monomers. These consist, for example, the starting materials required for producing the resin, e.g. formaldehyde and phenol, which have been left unconverted by the reaction or regenerated in the course of binding the fibers or subsequently.

The utilization of sulfite or bisulfite compounds in phenol-formaldehyde condensation products is known. For example, Higginbottom in U.S. Pat. No. 3,956,205 disclose, s the use of sodium sulfite as a formaldehyde scavenger in such condensation products. Similarly, Meyer in U.S. Pat. No. 4,264,760 discloses the addition of sulfur-containing compounds, e.g., sulfite and disulfites, in sufficient quantities to bind the free formaldehyde in resins, including phenol-formaldehyde resins. Alkali metal sulfites and bisulfites are also used as catalysts in the preparation of phenol-aldehyde resins. See Dietrick, et al. in U.S. Pat. No. 3,328,354 and Hood et al. in U.S. Pat. No. 4,608,408 (phenol-resorcinol-formaldehyde resins), and Daubach, et al. in U.S. Pat. No. 3,872,056 (phenol-formaldehyde condensates).

Sulfites and/or bisulfites have also been added to phenol-formaldehyde resins or formed in situ following an alkali catalyzed reaction. According to the process of Komarck et al. in U.S. Pat. No. 3,065,039 for preparing tanning agents, phenols are reacted with formaldehyde in an alkaline medium (e.g., by adding sodium hydroxide) to form a low molecular weight resin containing methylol groups. Sulfur dioxide is then introduced into the resin by blowing or pouting, until a permanent neutral reaction is obtained. Sodium bisulfite is formed in situ if sodium hydroxide was used in the alkaline medium. The sodium sulfite solubilizes the resin. In Baxter, U.S. Pat. No. 3,108,990, sodium sulfite and/or sodium bisulfite are used as antioxidants to prevent scumming and improve storage-life of highly alkaline (pH of 10 to 14), high molecular weight, phenol-formaldehyde resins. Baxter observed that the addition of small quantities of sodium sulfite to a phenolic resin did not deleteriously affect the resin or its resin adhesive properties and water solubility, particularly for use in plywood production.

The present invention is based on the discovery that the addition of a proper amount of a sulfite or bisulfite compound(s) to a phenolic resole resin result in unexpected and large increases in compressive strengths and flexural strengths measured on glass fiber reinforced laminates prepared using the resins of the present invention. The modified resins also possess increased water dilutability and storage life and dramatic reductions in organic volatile emissions during cure.

DISCLOSURE OF THE INVENTION

The present invention is directed to a phenolic resin composition useful for preparing a binder for reinforced composites, to a method for preparing the phenolic resin composition, to a binder for reinforced composites made using the phenolic resin composition, and to a reinforced composite made using the binder.

The present invention relates to a method for preparing a phenolic resole resin composition comprising:

(a) reacting a phenol, preferably phenol itself, with an aldehyde, preferably formaldehyde, at a mole ratio of formaldehyde to phenol ranging from about 0.6:1 to about 4:1, preferably from about 0.7:1 to about 2:1 and more preferably from about 1:1 to about 1.8:1, and with the resulting resole resin having a number average molecular weight ranging from about 100 to about 1000, and (b) adding or forming in situ a sulfite or bisulfite, which is preferably water-soluble, wherein the resulting phenol-aldehyde reaction product has a pH at least about 7 and less than 9.5, preferably from about 7 to about 9, and the composition contains about 0.007 to about 0.4 mole equivalent of sulfur per mole of phenol, preferably from about 0.14 to about 0.2 mole equivalent of sulfur per mole of phenol.

The phenolic resin composition of the present invention comprises an aqueous mixture of:

(a) a resole formed by reacting phenol with formaldehyde at a mole ratio of formaldehyde to phenol ranging from about 0.6:1 to about 4:1, preferably from about 0.7:1 to about 2:1, and more preferably from about 1:1 to about 1.8:1, and (b) a sulfite or bisulfite, which is preferably water-soluble, wherein said resole has a pH at least about 7 and less than 9.5, preferably from about 7 to about 9, and said composition contains from about 0.007 to about 0.4 mole equivalent of sulfur per mole of phenol, preferably from about 0.14 to about 0.2 mole equivalent of sulfur per mole of phenol.

A reinforced composite binder according to the present invention comprises a mixture of the above-described phenolic resin composition with conventional additives such as flexibility and toughening agents such as rubbers, polyamides and other thermoplastics, and coupling agents such as silane coupling agents.

The present invention also relates to a method of making a reinforced composite which comprises:

(1) coating inorganic and/or organic reinforcing components, e.g. chopped, woven and/or non-woven inorganic and/or organic fibers, with an aqueous binder composition comprising an aqueous mixture of:
  (i) a resole formed by reacting phenol with formaldehyde at a mole ratio of formaldehyde to phenol ranging from about 0.6:1 to about 4:1, preferably from about 0.7:1 to about 2:1, and more preferably from about 1:1 to about 1.8:1, and
  (ii) a sulfite or bisulfite, which is preferably water-soluble,
wherein said resole has a pH at least about 7 and less than 9.5, preferably from about 7 to about 9, and said composition contains from about 0.007 and about 0.4 mole equivalent of sulfur per mole of phenol, preferably from about 0.14 to about 0.2 mole equivalent of sulfur per mole of phenol;

(2) drying said coated reinforcing component with minimal curing of said binder (i.e., to a B-stage) to form a prepreg; and (3) applying pressure, heat or a combination of pressure and heat to said prepreg to cure said dried binder into a matrix forming said composite. Alternatively, prior to curing the dried binder, a layered composite may be formed by (3) layering a plurality of said prepregs to form a layered structure; and (4) then applying pressure, heat or a combination thereof to said layered structure to cure said dried binder into a matrix forming said composite.

The present invention aim relates to a method of making a reinforced composite which comprises:

(1) coating an inorganic and/or organic honeycombed reinforcing component with an aqueous binder comprising an aqueous mixture of:
  (i) a resole formed by reacting phenol with formaldehyde at a mole ratio of formaldehyde to phenol ranging from about 0.6:1 to about 4:1, preferably from about 0.7:1 to about 2:1, and more preferably from about 1:1 to about 1.8:1, and
  (ii) a sulfite or bisulfite, which is preferably water-soluble,
wherein said resole has a pH at least about 7 and less than 9.5, preferably from about 7 to about 9, and said binder contains from about 0.007 and about 0.4 mole equivalent of sulfur per mole of phenol, preferably from about 0.14 to about 0.2 mole equivalent of sulfur per mole of phenol;

(2) curing the binder coating on said coated reinforcing component;

(3) repeating steps (1) and (2) until a desired cured binder content in said honeycombed reinforcing member is achieved forming said composite.

The honeycombed reinforcing component is typically of a stretchable material. Accordingly, the honeycombed reinforcing component is stretched to the desired extent and shape prior to the coating step. Once the coating and curing steps are completed (i.e., step (3) above is completed), the stretching force on the reinforcing component is released with the cured binder imparting rigidity and strength thereto and thereby maintaining the reinforcing component in its stretched shape.

The present invention further relates to a reinforced composite made in accordance with these methods.

The phenolic resins useful in the practice of the invention are characterized in the art as phenol-aldehyde resole resins. Phenol-aldehyde resole resins are well known in the art and are thermosetting phenol-aldehyde type resins consisting primarily of partially condensed phenol alcohols. The phenolic resole resin of the present invention is prepared by reacting an aldehyde, e.g. formaldehyde, with a phenol, e.g. phenol itself, for example, under basic reaction conditions or mildly acidic conditions (e.g. with zinc acetate). Formaldehyde is used in an amount of between about 0.6 and about 4 moles per mole of phenol. Accordingly, in the lower mole ratios (i.e., about 0.7:1 to less than 1:1), the resole contains excess phenol. Preferably, about 0.7 to about 2 moles and more preferably about 1 to about 1.8 moles of formaldehyde per mole of phenol is used. As used in the art, the term "resole" refers to phenolic resins that contain useful reactivity (thermosetting), as opposed to cured resins or resins that do not contain useful reactivity. At this stage, the product is fully soluble in one or more common solvents, such as alcohols and ketones, and is fusible at less than 150° C.

The catalyst used in preparing the resoles of the present invention is not critical. Accordingly, any catalysts normally used for preparing phenolic resole resins may be used in accordance with the present invention. Such catalysts are those capable of deprotonating phenols and well known in the art. Typical catalysts include alkali metal hydroxides such as sodium hydroxide, potassium hydroxide and lithium hydroxide; alkali metal carbonates such as sodium carbonate and potassium carbonate; the oxide, hydroxide or organic acid salt of a divalent electropositive metal such as Zn++, Mg++, Mn++, Ca++, Co++, Ba++, Sr++, Cd++, and Pb++ or mixture thereof; and ammonium hydroxide and/or amine selected from the group consisting of primary amines (such as ethylamine, isobutylamine, ethanol amine and cyclohexylamine), secondary amines (such as diethanol amine, piperidine and morpholine), and tertiary amines (such as hexamethylene tetramine, triethylamine, triethanol amine, diethyl cyclohexyl amine and triisobutylamine). See U.S. Pat. No. 5,032,431 to Conner et al.; U.S. Pat. Nos. 4,122,054 and 4,157,324 to Culbertson; U.S. Pat. No. 4,235,989 to Leong et al.(metal carboxylate catalysts): and U.S. Pat. No. 4,043,970 to Dahms (amine catalysts and ammonium hydroxide), all incorporated herein by reference. Examples of organic acid salts include zinc acetate, cobalt acetate, cadmium formate, magnesium acetate, lead acetate and zinc benzoate. Based on considerations of cost and availability, sodium hydroxide is used most often. If necessary, a desired pH may be suitably achieved by adding a base or an acid as the case may be. After the resole is prepared, the sulfite or bisulfite containing compound is added thereto or a sulfur-containing compound capable of forming a sulfite or bisulfite in situ in the resole is added thereto.

During the initial reaction of the phenol and formaldehyde, only that amount of catalyst or catalysts necessary to produce a phenolic resin need be added to the reaction mixture. Together with the present disclosure, the determination of suitable amounts of the catalyst for preparing a phenolic resin for a particular end use is within the skill of those skilled in the art. Typically, at least about 0.01 equivalent of the catalyst per mole of phenol is used, with an amount between about 0.01 and about 0.4 equivalent per mole of phenol being preferred, with about 0.05 to about 0.1 equivalent per mole of phenol being more preferred. Usually, no more than about 0.4 equivalent of catalyst per mole of phenol should be added. By "one equivalent" as that term is used above is that amount of the catalyst relative to or corresponding to one mole of hydroxyl. Accordingly, one equivalent of a divalent metal catalyst corresponds to 0.5 mole of the catalyst and one equivalent of a monovalent catalyst corresponds to 1 mole of the catalyst. Normally, the catalyst is added incrementally to the reaction mixture in two or more portions, although the complete amount can be added when initiating the reaction. The formaldehyde reactant is added to the condensation reaction usually as an aqueous solution containing from about 30 to about 55 weight percent or more of formaldehyde, or in a polymeric form such as paraformaldehyde. It is to be understood that formaldehyde may also be added to the reaction in the form of other substances capable of providing free formaldehyde under the conditions described herein. The full complement of the formaldehyde source can be present at the start of the reaction or it can be added incrementally or metered into the reaction mixture during the course of the reaction.

Although the composition of the invention is defined in terms of formaldehyde and the use of formaldehyde is preferred, it is well known in the art that other aldehydes such as acetaldehyde, paraldehyde, glyoxal, propionic aldehyde, butyraldehyde, isobutyraldehyde, isopentaldehyde, furfural, 2-ethylhexanal, ethyl-butyraldehyde, heptaldehyde, benzaldehyde, crotonaldehyde and the like can be substituted for formaldehyde in phenol-formaldehyde resins. Preferably, the aldehyde should have not more than 8 carbon atoms and should not detrimentally affect the resinification of the resin. Preferred aldehydes are those having from 1 to 4 carbon atoms, such as formaldehyde, which may be in aqueous solution (e.g. 30 percent or higher), or in any of its low polymeric forms such as paraformaldehyde or trioxane. These other aldehydes and mixtures thereof may be used in place of formaldehyde or in partial substitution thereof; but preferably, formaldehyde in one of its commercially available forms is used. The use of other aldehydes is, therefore, contemplated for use in preparing compositions of the present invention. Further, ketones such as acetone may also be used.

Examples of phenols which can be used in preparing a phenol-aldehyde resole for use in practicing the invention include ortho-, para-directing hydroxy or amino aromatic compounds having 6 to 24 carbon atoms such as phenol itself ($C_6H_2OH$), naphthol, anthranol and substituted derivatives thereof where the substituents on the aromatic compound are independently selected from hydrogen; halogen, such as Cl, Br, and F; $NH_2$; and hydrocarbon radicals, such as:

a. alkyl groups or radicals of 1 to 12 carbon atoms, preferably of 1 to 9 carbon atoms, and their various isomeric forms and substituted on the aromatic nucleus.

b. cycloalkyl groups of 5 to 12 carbon atoms such as cyclohexyl, cyclopentyl, methylcyclohexyl, butylcyclohexyl, and so forth;

c. aryl ketonic groups wherein the hydrocarbon portion is as defined below in (e);

d. alkyl, aryl and cycloalkyl carboxylic groups wherein the hydrocarbon part is defined as above in (a) and (b);

e. aryl groups of 6 to 24 carbon atoms such as phenyl, naphthyl, anthryl, and the like;

f. aryl substituted alkyl wherein the aryl is phenyl which may contain lower alkyl and/or hydroxy substituents so that the resulting hydroxy aromatic is, for example, a bisphenol;

g. the oxyhydrocarbon radicals corresponding to the foregoing hydrocarbon radicals; and h. mixtures of the aforesaid hydroxy aromatics.

Suitable substituted phenols include meta-cresol, m-propyl phenol, m-isobutyl phenol, m-sec-butyl phenol, m-tert-butyl phenol; m-bromo phenol, m-chloro phenol, m-phenyl phenol, m-benzyl phenol, m-cetyl phenol, m-cumyl phenol, m-hydroxyacetophenone, m-hydroxy-benzophenone, m-d-limonene phenol. The corresponding phenols substituted in the ortho- and para-positions can be used in part but are not preferred.

Mixtures of various hydroxy aromatic compounds mentioned herein also may be used.

Included among the phenolic reactants which may be used are those known as the "cresylic acids" and these often comprise heterogeneous mixtures having one to three reacting hydrogen positions on each of them; that is, compounds unsubstituted in the ortho- and para-positions, and hence, yield relatively unreactive resins. These compounds may include the following: 3,5-xylenol, m-cresol, 3,4-xylenol, 2,5-xylenol, 2,3-xylenol, phenol, p-cresol, o-cresol, 2,4-xylenol, and 2,6-xylenol. Cresylic acids or tar acids may include phenol and its homologs which may include cresols, xylenols, trimethyl phenols, ethyl phenols, and higher boiling materials such as dihydroxy phenols, polycyclic phenols and the like. They are often obtained by a low-temperature trimerization of coal, lignite, and the like, or a conventional high-temperature coke oven tar, or the liquid product of petroleum cracking both thermo and catalytic, shell oil, coal hydrogenation products, and the like.

Polyhydroxyaromatic reactants, such as resorcinol, may also be used. Also useful in this invention are mixtures of aniline and phenol to react with an aldehyde or ketone to produce a resole. Additionally, sodium lignosulfonate may also be substituted for a portion of the phenol.

Though not preferred, also useful in the invention are mixtures of urea and phenol to react with the aldehyde or ketone to produce a resole.

Preferably, the phenols suitable for use in the invention are phenol per se or substituted phenols or mixtures thereof, more preferably phenol itself. Such phenols can be represented by the formula:

$$C_6H_{5-a}(OH)(X)_a$$

where "X" is a monovalent radical such as an alkyl, cycloalkyl, aryl, alkaryl, aralkyl, alkoxy, halogen and the like and "a" is from 0 to 3, and wherein at least two of the ortho- and para- positions relative to the hydroxy group are free. Preferably an ortho-position should be free. Most preferably the substituents should be in the meta-positions only, leaving the ortho- and para-positions free. Examples of suitable substituted phenols are cresol, isopropylphenols, nonylphenols or dihydric phenols, such as bis-phenol A, bis-phenol F, hydroquinone, catechol and resorcinol. Use of substituted phenols will tend to alter the properties of any resulting phenolic resin which is derived from the resulting product, such property changes being of the kind which allows for a maximum variety of phenolic resin product types. For example, a halogen substitution should enhance the flame retardancy of the resultant phenolic resin. If mixtures of phenols are used, the mixtures preferably contain phenol.

The reaction is carried out at a temperature of from about 30° C. to about 100° C. as desired to achieve a phenolic resin possessing the desired properties for the anticipated application. Such is within the skill of the art. Preferably, the temperature is controlled within the range of about 45° C. to about 95° C. Any method known to those skilled in the art for controlling the temperature can be used such as direct cooling using cooling coils immersed in the reaction mixture, indirect cooling using a jacketed reactor, or by conducting the reaction at reflux under a vacuum. The reaction time normally will range from about one (1) to about six (6) hours. The pH of the resin typically remains between about 7 and about 9, and does not exceed 9.5. If the pH is too high, conditions favor a Cannizzaro reaction and more oxidation which are not desirable. If the pH is too low, conditions do not favor methylolation and the phenol and aldehyde do not react. The resultant resin has a relatively low molecular weight, typically ranging from about 100 to about 1,000 number average molecular weight.

After preparing the resole resin, a sulfite-containing or bisulfite-containing compound or in situ sulfite-forming or bisulfite-forming compound, which are preferably water-soluble, (hereinafter collectively referred to as "sulfite compound") is added to the aqueous phenolic resin. The sulfite compound may be organic or inorganic and is added in an amount ranging from about 0.007 to about 0.4 mole equivalent of sulfur per mole of phenol, and preferably ranging from about 0.14 to about 0.2 mole equivalent of sulfur per mole of phenol. Suitable sulfite compounds include organic and inorganic sulfites and bisulfites, preferably inorganic sulfites and bisulfites such as alkali metal sulfites and bisulfites and alkaline earth metal sulfites and bisulfites and more preferably alkali metal sulfites and bisulfites. Suitable organic sulfites include alkyl sulfites and pyrosulfites. Based on cost and availability, sodium sulfite and sodium bisulfite are preferred. The sulfite additive is introduced simply by mixing it with the aqueous resin. Typically, no heating is necessary during this addition and mixing step.

It also is possible to form the necessary sulfite compound in situ by reacting sulfur dioxide ($SO_2$) with an alkali metal hydroxide such as sodium hydroxide. Neutralizing each mole of $SO_2$ requires one mole of alkali metal hydroxide to form the bisulfite compound, while neutralizing each mole of $SO_2$ requires two moles of hydroxide to form the sulfite compound. Pyrosulfites, thiosulfates and polysulfur compounds are also materials similarly capable of producing sulfites or bisulfites when added to a phenolic resin. After addition or in situ formation of the sulfite compound, the pH of the aqueous phenolic resin composition will be at least about 7 and less than 9.5. Typically, the pH of the resin composition will range from about 7 to about 9.

The phenol/formaldehyde reaction product is an aqueous mixture. The water content thereof generally ranges from about 10 to about 65 weight percent, and is usually no more than about 35 to about 60 weight percent. Water may be introduced to the system with the formaldehyde, which is usually added as an aqueous solution, or with the catalyst which is usually added as a preformed aqueous solution or dispersion, e.g. suspension. Varying amounts of water also may be formed as a by-product during the reaction. Concentrating the liquid resin product to a particular predetermined water content is readily accomplished by conventional stripping at reduced pressure such as, for example, at a reduced absolute pressure from about one to about 200 mm of mercury absolute and at temperatures from about 30° C. to about 75° C. In such a manner, the resin is dehydrated to about 20 to 99 percent solids, preferably to about 40 to about 85 percent solids.

The specific nature of the resulting phenolic resole resin, such as its molecular weight, is not narrowly critical. However, for saturation and composite applications disclosed herein, the number average molecular weight ranges from about 100 to about 1000. Normally, what is preferred in terms of resin viscosity and the like depends to some extent on the process used to make the reinforced composite product. For example and preferably, the phenolic resin preparation reaction can be controlled to produce primarily monomeric methylol phenols, with small amounts of dimeric and trimeric methylol species. Such materials have low viscosities and therefore flow and saturate better than higher molecular weight resins.

Other conventional binder additives compatible with the phenolic resin composition may be added to the binder. Such additives include formaldehyde scavengers, such as ammonia and urea.

The binder composition of this invention may comprise a variety of liquid forms, including solutions, miscible liquids, or dispersions and the like and combinations of such liquid forms depending upon the optional ingredients blended into the binder composition. Where the term solution or any of the variations thereof is used herein it is intended to include any relatively stable liquid phase.

Suitable fibers are well known to those skilled in the art and include inorganic fibers, organic fibers and combinations thereof. Examples of such fibers are glass fibers, mineral wool, carbon fibers, aramid fibers and other thermoplastic fibers and cellulose fibers. Honeycombed reinforcing components are also well known to those skilled in the art, for example, aramid honeycomb blocks which are commercially available.

The binder can be applied to, for example, glass fibers by flooding or dipping the collected mat of glass fibers and draining off the excess, by applying the binder composition onto the glass fibers during mat formation, by spraying the glass fiber mat or the like. For prepregs, the layer of fiber with binder is dried in a manner to minimize cure, i.e. to a B-stage. A plurality of the prepregs are then layered and then compressed and shaped into the form and dimensions of the desired end product and heated until the binder is cured in a conventional manner, thus fixing the size and shape of the finished product by bonding the prepregs to one another and forming an integral composite structure. The glass fiber component will represent the principal material of a glass insulation product. Usually from about 99 to about 60 percent by weight of the product will be composed of the glass fibers while the amount of cured binder will be in reverse proportion, i.e., from about 1 to about 40 percent, depending upon the density and character of the product. A prepreg for making laminates typically contains from about 20 to about 60 percent cured binder.

The binder may also be used as a saturating composition for honeycombed structures. Such structures are of a material which can be stretched. In its stretched condition, it is dipped into the composition and after allowing any excess to drain the resulting coating is cured. The process is repeated until the desired resin content is achieved. At this point, the stretching force on the structure is removed with the cured coating maintaining the structure in its stretched form. The cured resin maintains the rigidity and adds strength to the honeycombed structure.

Example A (Control: Comparative Example)

A reactor equipped with an agitator, reflux condenser, and means for establishing vacuum was charged with about 4,584 grams of phenol and about 4,848 grams of aqueous 50% formaldehyde (formaldehyde to phenol molar ratio (F/P) of about 1.66:1). About 293 grams of aqueous 50% sodium hydroxide (caustic) (about 0.075 mole caustic per mole of phenol) was slowly added to the reactor while maintaining its contents under a condition of vacuum reflux at about 55° C. Once the caustic addition was completed, the reaction solution was heated slowly to about 65° C. over about 30 minutes. The reaction was continued at about 65° C. until the free formaldehyde fell to less than about 2.0% by weight based on the total composition. The resin was cooled to about 55° C. and the pH was about 8.5. The mixture was vacuum distilled at about 55° C. until a final nonvolatile solids content of about 62% was achieved and cooled to about 25° C. and labelled "Control."

Example B (Sulfite)

To the product from Example A was added 1% by weight sodium sulfite, which was then stirred to dissolve same. This product is according to the present invention and was labelled "S-1."

Example C (Sulfite)

To the product from Example A was added 3% by weight sodium sulfite, which was then stirred to dissolve same. This product according to the present invention was labelled "S-3."

Example D (Bisulfite)

To the product from Example A was added 3% by weight sodium bisulfite which was then stirred to dissolve same. This product according to present invention was labelled "B-3."

Example E (Dynamic Mechanical Analysis)

Figure 1:
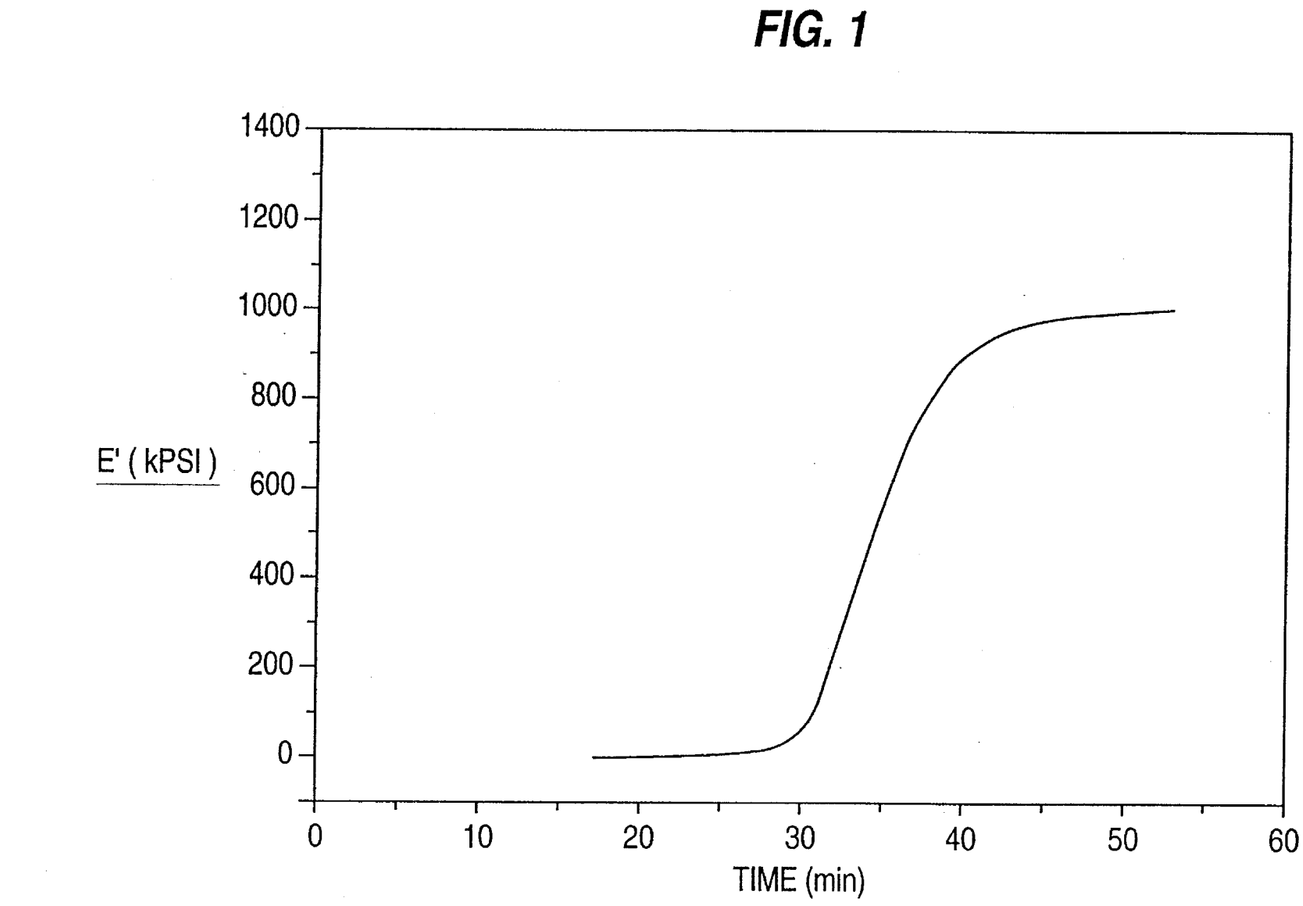
FIG. 1 is a Dynamic Mechanical Analysis (DMA) trace for a prior art resin—a water borne, phenol-formaldehyde resin.
Figure 2:
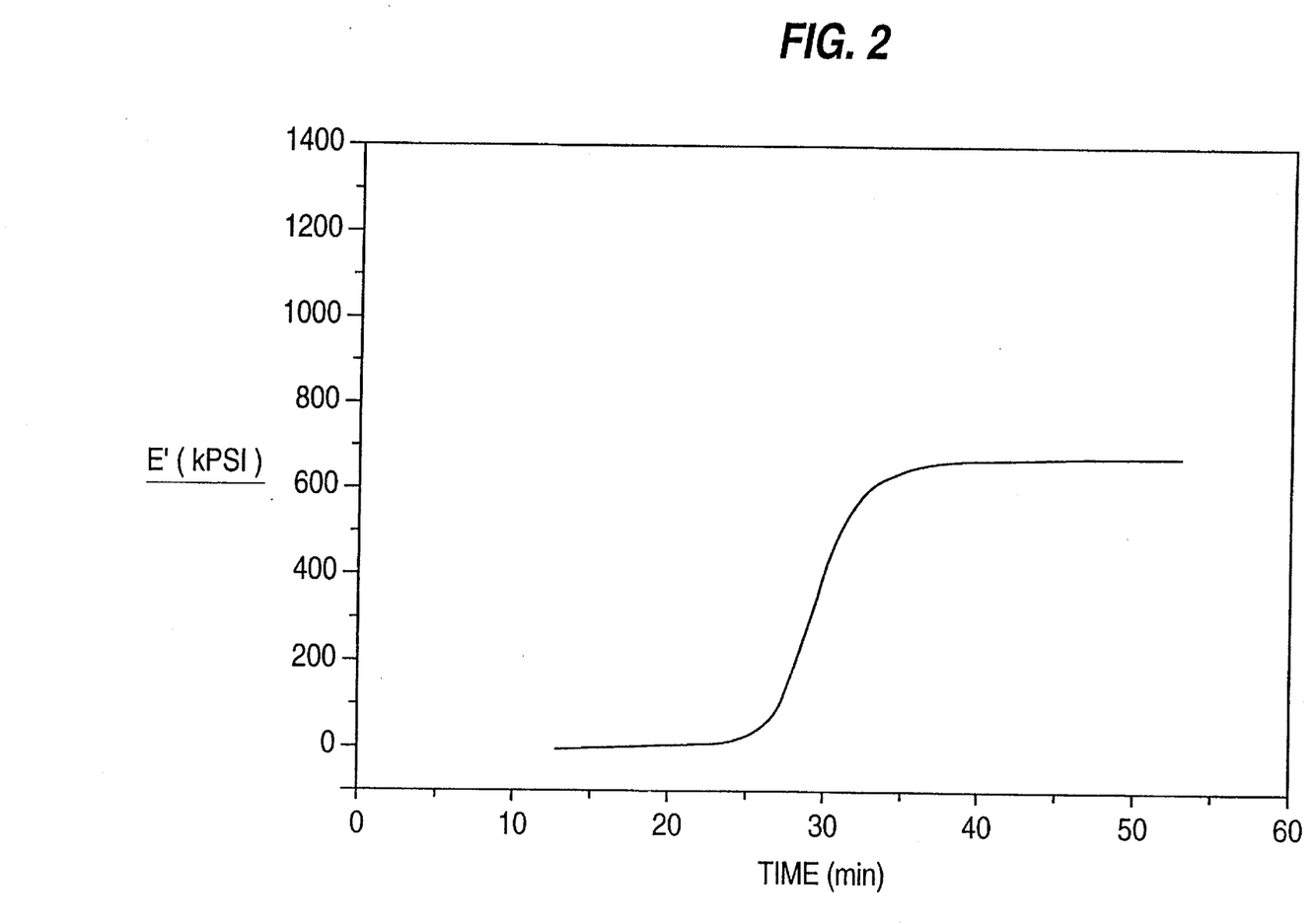
FIG. 2 is a DMA trace for a prior art resin in a solvent borne phenol-formaldehyde resin (Control 2).
Figure 3:
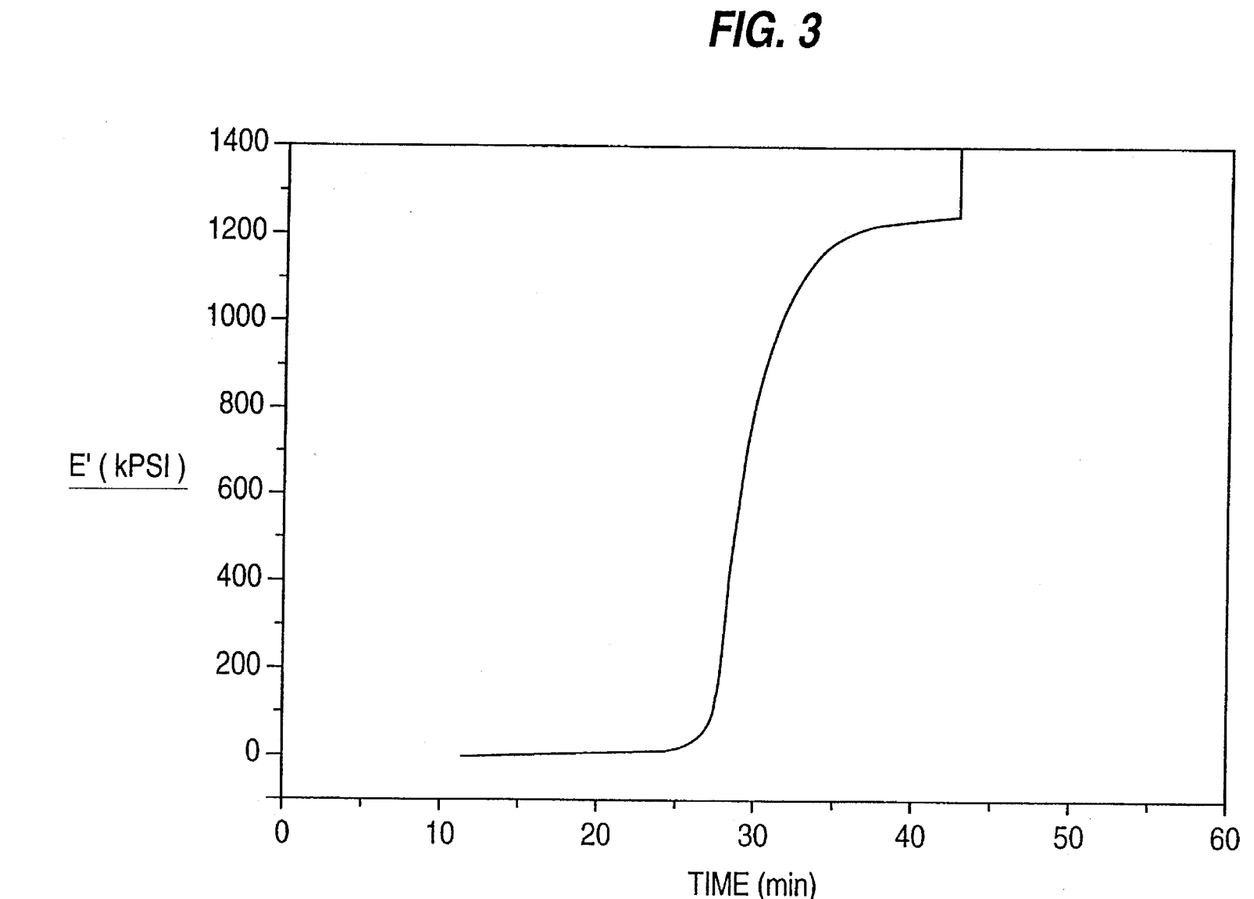
FIG. 3 is a DMA trace for a resin according to the present invention (S-3, Example C).

Dynamic Mechanical Analysis (DMA) was performed on test samples prepared using the resin of Example A (Control), Example C (Control +3% by weight sodium sulfites; S-3) and a standard solvent-borne laminating resin (resole prepared using triethylamine catalyst and having a similar P/F mole ratio to the Control) (Control II) FIG. 1–3 are DMA traces of test samples using the resins of Control, Control II and Example C (S-3), respectively. The attached DMA traces show a dramatic increase in storage modulus (E') for the sulfite modified resin (Example C; S-3) relative to the Control. The commercial solvent-borne product data is included only as a comparative reference (Control 2).

Example F (Compressive Strength and Modulus)

Prepregs were prepared using a conventional solution process from unsized woven glass (gray goods) using the resins from Examples A (Control), B (S-1) and C (S-3) at about 34% resin content. Six-ply zero degree laminates having a thickness of about 0.053 inches were produced by pressing and curing at about 325° F. for about ten (10) minutes under about 250 psi pressure. 3 inch×2 inch specimens were then prepared and tested using an Instron tester in a 3 point compression mode. Six replicates each were tested and compressive strength and modulus data were generated for each. Averaged data are shown in Table I.

The data clearly reveal the enhanced compressive strength and modulus obtained using the sulfite modified resin of the present invention. (Examples B (S-1) and C (S-3) resins vs. Example A (Control) resin).

TABLE I

| Resin | Level Sodium Sulfite (% wt.) | Stress (psi) | Strain (in/in) | Modulus (psi) |
|---|---|---|---|---|
| Control | 0 | 30,846 | 0.01581 | $2.34 \times 10^6$ |
| S-1 | 1 | 32,610 | 0.01523 | $2.35 \times 10^6$ |
| S-3 | 3 | 48,239 | 0.01864 | $3.89 \times 10^6$ |
| B-3 | 3[a] | 41,511 | 0.0159 | $2.602 \times 10^6$ |

[a]Sodium bisulfite level.

Example G: (Varying Formaldehyde to Phenol with Ratio)

Similar to the procedure for preparing the Control resin in Example A, two additional control resins Control 3 and Control 4 were prepared using a formaldehyde to phenol (F/P) mole ratio of 1:1 and 1.5:1, respectively. Sulfite modified versions of these two controls were also prepared by adding about 3% by weight sodium sulfite. These resins were labelled G3 and G4, respectively. Prior to sulfite addition Control 3 had been less than 0.2% free formaldehyde and Control 4 had been less than 0.7% free formaldehyde.

These four resins were then applied to woven gray good glass to a resin loading of about 34% and subsequently prepregged. Six ply laminates and test samples were then produced according to the procedure set forth in Example F. Compressive strength data (six replicates) were obtained using an Instron tester in the same manner as Example F. The results (average of the six replicates) are given in Table II.

TABLE II

| Resin | Level of Sodium Sulfite (% wt.) | F/P | Compressive Strength (psi) |
|---|---|---|---|
| Control 3 | 0 | 1:1 | 54,815 |
| G3 | 3 | 1:1 | 62,379 |
| Control 4 | 0 | 1.5:1 | 47,415 |
| G4 | 3 | 1.5:1 | 55,118 |

Example H (Storage Life Data)

Storage life data were obtained for product S-3 (Example C) and Control (Example A) at 25° and 35° C. The product modified with sulfites according to the present invention (S-3) retained greater than about 100:1 water dilutability for up to 9 days at 35° C. and greater than 45 days at 25° C., while a control resin (Example A) with zero sulfite treatment gave a water dilutability greater than about 100:1 water dilutability for up to 4 days at 35° C. and for up to 12 days at 25° C. This surprising increase in storage stability was not expected and is of benefit to applications requiting long storage times and the complete absence of organic solvents.

Example I (Strength Data)

The product from Example C (resin S-3) was used to prepare glass fiber reinforced laminates in accordance with protocol set forth by MIL-R-9299c specifications (Dec. 3, 1968). The resin was prepregged using a conventional solution process using 7781 glass fabric (available from BGF Industries) with A-1100 soft finish (a silane coupling agent, an amino propyl triethoxy silane available from Union Carbide Corporation). Fourteen (14) plies (18 inches by 36 inches) of that prepregging were used and cured and compressed at about 325° F. under about 250 psi pressure for about ten (10) minutes. Test specimens were then prepared and tested using the ASTM procedures identified below. The results are given in Table III (room temperature flexural properties per ASTM D-790), IV (room temperature compression properties per ASTM D-695), and V (room temperature tensile properties per ASTM D-638).

TABLE III (room temperature flexural properties)

| Test | Example A (Zero Sulfite) | Example C (3% Sulfite) |
|---|---|---|
| Flexural Strength (psi) | 48,130 | 97,200 |
| Flexural Modulus (psi × 10$^{-6}$) | 2.65 | 4.2 |
| Resin Content (%) | 34.9 | 29.0 |
| Laminate Thickness (inches) | 0.137 | 0.128 |

14 plies cured at 325° F. for 10 minutes under 250 psi.
Specimen = 1" × 3", crosshead speed = 0.05 inches/min., span = 2 inches

TABLE IV (room temperature compression properties)

| Test | Example A (Zero Sulfite) | Example C (3% Sulfite) |
|---|---|---|
| Compressive Strength (psi) | 38,270 | 75,560 |
| Compressive Modulus (psi × 10$^{-6}$) | 2.65 | 3.8 |
| Resin Content (%) | 34.9 | 29.0 |
| Laminate Thickness (inches) | 0.137 | 0.128 |

14 plies cured at 325° F. for 10 minutes under 250 psi.
Specimen = dog bone, speed = 0.05 inches/min.

TABLE V (room temperature tensile properties)

| Test | Example A (Zero Sulfite) | Example C (3% Sulfite) |
|---|---|---|
| Tensile Strength (psi) | 59,340 | 66,500 |
| Tensile Modulus (psi × 10$^{-6}$) | 2.74 | 3.95 |
| Tensile Elongation (%) | 2.2 | 2.3 |
| Resin Content (%) | 34.9 | 29.0 |
| Laminate Thickness (inches) | 0.137 | 0.128 |

14 plies cured at 325° F. for 10 minutes under 250 psi.
Speed = 0.2 inches/min., specimen = dog bone Type I.

Example J (Flame and Smoke Data)

Prepregs were prepared using a conventional solution process from 7781 glass fabric using the resin from Example C at about 31.5% resin content. Six-ply zero degree laminates having a thickness of about 0.053 inches were produced by pressing and cutting at about 325° F. for about ten (10) minutes under about 250 psi pressure. The OSU heat release, NBS smoke test, and flammability tests were performed on these laminates. The results were as follows with the values required to pass the respective test shown in brackets:

NBS Smoke (F-814; specimen = 3" × 3" )
(optical density @ 4 min.) = 1 [<20]
OSU (Ohio State University heat release value (ASTM E-906, specimen = 6" × 6")) (2 min heat release/max heat release) = 11/23 Kw-min-m$^{-2}$/Kw-m$^{-2}$ [50/50]
Flammability (FAR 25.853A, specimen = 0.5" × 6")
Self extinguishing time (sec) = [<5]
Burn length (inches) = 1.5 [<3]
Drip extinguishing time (sec) = no drip [<1 sec]

Standard unmodified phenol-formaldehyde resin (Control; Example A) under identical conditions gave equivalent results.

The data displayed in the tables and figures clearly demonstrate the enhancement of properties expected using the products of this invention for reinforced composites.

The use of phenolic resole resins containing sulfite have resulted in unexpected improvements in strength, storage life, and reduced organic volatile emissions during processing and cure have been substantiated.

Although the technology disclosed here suggests the use of water-based resins, the property enhancements are expected to function in solvent based systems as well, but with associated organic volatile emission increases.

Products prepared using the sulfite modified resole resins of the present inventions are especially desirable in applications where low flame and smoke properties are required. The incorporation of sulfites or bisulfites does not detract from the well known excellent flame and smoke properties of unmodified phenolic resins. Accordingly, such products would be desirable for applications in the aerospace and ship industry and others requiring resistance to fire and smoke generation. Further, the additions of relatively small amounts of sulfites and bisulfites to conventional phenol aldehyde resoles results in increased water solubility, enhanced storage stability, reduced free aldehyde content, and surprisingly rather sizable increases in compressive strength relative to the same resins without such additives. Though not wishing to be bound to any particular theory, the increase in compressive strength is believed to result from the reaction of the sulfur containing moiety with the methylol phenols in the resole resin.

Although the invention has been described in its preferred forms with a certain degree of particularity, it is understood that the foregoing form has been made only by way of example and that numerous changes may be made without departing from the spirit and the scope of the invention.

What is claimed is:

1. A method of making a reinforced composite of improved compressive strength which comprises:
    (1) coating reinforcing components selected from inorganic fibers, organic fibers, inorganic honeycomb and organic honeycomb with an aqueous binder composition comprising an aqueous mixture of:
        (I) a resole having a pH at least about 7 and less than 9.5 formed by reacting phenol with formaldehyde at a mole ratio of formaldehyde to phenol ranging from 0.6:1 to about 4:1, and
        (ii) a sulfite or bisulfite in an amount sufficient to produce at least about a 10% increase in the compressive strength of the reinforced composite relative to said composite made with said resole in the absence of said sulfite or bisulfite,
    (2) drying said coated reinforcing component with minimal curing of said binder to form a prepeg;
    (3) forming a structure with at least one of said prepegs, and
    (4) applying pressure, heat or a combination thereof to said structure to cure said dried binder and form said composite.

2. The method of claim 1, wherein said forming step comprises layering a plurality of said prepregs to form said structure.

3. The method of claim 1, wherein said mole ratio of formaldehyde to phenol ranges from about 0.7:1 to about 2:1.

4. The method of claim 1, wherein said binder composition contains from about 0.14 to about 0.2 mole equivalent of sulfur per mole of phenol.

5. A reinforced composite made in accordance with the method of claim 1.

6. A method of making a reinforced composite of improved compressive strength which comprises:
    (1) coating a honeycomb reinforcing component with an aqueous binder composition comprising an aqueous mixture of:
        (I) a resole having a pH at least about 7 and less than 9.5 formed by reacting phenol with formaldehyde at a mole ratio of formaldehyde to phenol ranging from 0.6:1 to about 4:1, and
        (ii) a sulfite or bisulfite in an amount sufficient to produce at least about a 10% increase in the compressive strength of the reinforced composite relative to said composite made with said resole in the absence of said sulfite or bisulfite,
    (2) curing the binder coating on said coated reinforcing component; and
    (3) repeating steps (1) and (2) until a desired binder content in said honeycomb reinforcing member is achieved forming said composite.

7. The method of claim 6, wherein said mole ratio of formaldehyde to phenol ranges from about 0.7:1 to about 2:1.

8. The method of claim 6, wherein said binder composition contains from about 0.14 to about 0.2 mole equivalent of sulfur per mole of phenol.

9. The method of claim 6, wherein said honeycombed reinforcing component is of a stretchable material and said method further comprising applying a stretching force to said honeycombed reinforcing component and stretching said honeycombed reinforcing component to the desired extent and shape prior to the coating step.

10. The method of claim 9, wherein once the coating and curing steps are completed, releasing the stretching force on the reinforcing component.

11. A reinforced composite made in accordance with the method of claim 6.

* * * * *